N. Goodwin,

Paddle Wheel.

No. 70,084. Patented Oct. 22, 1867.

Witnesses.
S. N. Piper
S. P. Hale jr.

William Goodwin
by his attorney.
R. H. Eddy.

United States Patent Office.

WILLIAM GOODWIN, OF BOSTON, MASSACHUSETTS.

Letters Patent No. 70,084, dated October 22, 1867.

IMPROVED PADDLE-WHEEL.

The Schedule referred to in these Letters Patent and making part of the same.

TO ALL PERSONS TO WHOM THESE PRESENTS MAY COME:

Be it known that I, WILLIAM GOODWIN, of Boston, in the county of Suffolk, and State of Massachusetts, have invented a new and useful improvement in Paddle-Wheels for Steam-Vessels; and do hereby declare the same to be fully described in the following specification, and represented in the accompanying drawings, of which—

Figure 1:
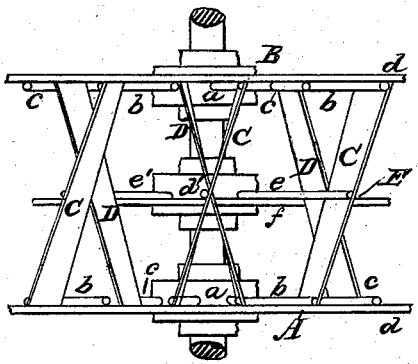
Figure 3:
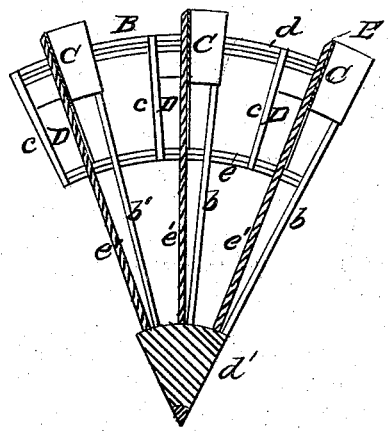
Figure 2:
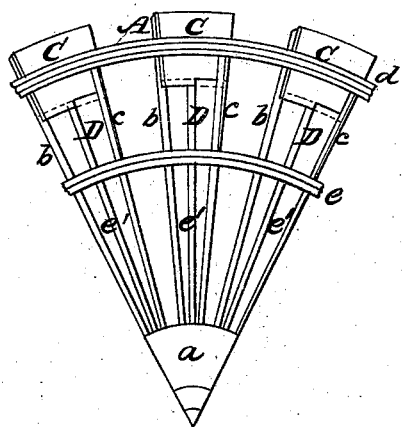

Figure 1 is a top view;
Figure 2 a side elevation, and
Figure 3 a longitudinal section of a sector of a paddle-wheel, made in accordance with my invention.

The common paddle-wheel having floats going square across it, is liable, while in operation, to the serious objection of lifting a great amount of water, such quantity of water being by its weight a material impediment to the wheel, and requiring a large exertion of power for overcoming or counteracting it.

In the construction of my improved wheel I have sought to avoid this difficulty, or, in other words, to so make the wheel as to cause it, while revolving in water, to raise or lift little if any thereof.

To accomplish this, I employ two series of floats or paddles, and arrange each float of each series obliquely with reference to the side frames of the wheel, and also so that each float of one series shall cross another float of the next series diagonally, both floats, at their middles, being fixed to one common radial arm. Furthermore, one float of the pair has its inner edge at or about at the same distance from the axis of the wheel as is the outer edge of the other float of such pair, the whole being as represented in the accompanying drawings, in which A and B are the side frames of the wheel, each of which is composed of a hub, $a$, a series of radial rods or spokes, $b\ b\ b$, $c\ c\ c$, &c., and two annuli $d\ e$, arranged as shown in fig. 2.

The outermost series of floats is shown at C C C, &c., and the innermost series at D D D, &c. Between the two frames A B is an intermediate or third frame, E, composed of a hub, $d'$, a series of radial arms, $e'\ e'\ e'$, and an annulus, $f$.

Each paddle or float C runs obliquely across the wheel, in a direction opposite that of its fellow-paddle or float D. In consequence of this, while the paddle may be in revolution in water, and both paddles are immersed therein, each of them will deflect the water from it in a direction laterally of the wheel, the water being deflected from one paddle in one direction, and from the other in the opposite direction. In practice, it has been found that scarcely any water will be lifted by the wheel, the chances for escape of the back water from the floats being so very great. By having two series of oblique floats or paddles, and those of one series arranged diagonally with respect to those of the other, the lateral strain on the wheel, effected by either series, will be counteracted by those produced by the other.

Although, in theory, there would be a loss of power in the action of this wheel, with reference to the common paddle-wheel, having a single set of floats square to its sides, (each float having an area equal to the combined areas of the two floats of a pair in my said improved wheel,) yet, practice has proved that, owing to the small amount of back water lifted by my wheel, there is a material gain of useful effect, and it requires less power to operate it, to obtain the same result, than can be effected by the said common wheel.

The outer paddle of each pair is attached at its ends to two of the radial arms $b\ b$ of the side frames A B; the inner paddle of the pair being connected at its ends to two of the auxiliary or shorter arms $c\ c$ of such frames.

What I claim as my invention, is—

The wheel, or combination as composed of the three frames A B E, made as described, and of the two series of paddles C D, having the paddles of each series arranged obliquely in the wheel, and diagonally and in other respects with regard to those of the other series, as explained, and also having each pair, C D, of such paddles united at their middles to one of the spokes or arms of the intermediate frame E, the whole being substantially as specified.

WILLIAM GOODWIN.

Witnesses:
R. H. EDDY,
SAMUEL N. PIPER.